United States Patent
Fukuoka et al.

(10) Patent No.: US 10,780,775 B2
(45) Date of Patent: Sep. 22, 2020

(54) TANK LID UNIT AND FUEL SUPPLY DEVICE

(71) Applicants: DENSO CORPORATION, Kariya, Aichi-pref. (JP); DENSO KOREA AUTOMOTIVE CORPORATION, Changwon-si, Gyeongsangnam-do (KR)

(72) Inventors: Shingo Fukuoka, Kari ya (JP); Yutaka Niwa, Kariya (JP); Sanghoon Lee, Changwon-si (KR); Hyoyeol Kim, Changwon-si (KR)

(73) Assignees: DENSO CORPORATION, Kariya (JP); DENSO KOREA AUTOMOTIVE CORPORATION, Changwon-si (KR)

( * ) Notice: Subject to any disclaimer, the term of this patent is extended or adjusted under 35 U.S.C. 154(b) by 224 days.

(21) Appl. No.: 15/776,165

(22) PCT Filed: Nov. 21, 2016

(86) PCT No.: PCT/JP2016/084441
§ 371 (c)(1),
(2) Date: May 15, 2018

(87) PCT Pub. No.: WO2017/104353
PCT Pub. Date: Jun. 22, 2017

(65) Prior Publication Data
US 2019/0009671 A1    Jan. 10, 2019

(30) Foreign Application Priority Data

Dec. 14, 2015    (JP) .................................. 2015-243348

(51) Int. Cl.
*B60K 15/05*    (2006.01)
*B60K 15/03*    (2006.01)
(Continued)

(52) U.S. Cl.
CPC .............. *B60K 15/05* (2013.01); *B60K 15/03* (2013.01); *F02D 33/003* (2013.01);
(Continued)

(58) Field of Classification Search
CPC ............................. B60K 15/05; B60K 15/03; B60K 2015/3243; B60K 2015/03467;
(Continued)

(56) References Cited

U.S. PATENT DOCUMENTS

2005/0281684 A1* 12/2005 Kumagai ............... F02M 37/10
417/360
2009/0071683 A1* 3/2009 Yasuda ................ H05K 1/0263
174/68.2

(Continued)

FOREIGN PATENT DOCUMENTS

JP    2001-099029    4/2001
JP    2008-291701    12/2008

*Primary Examiner* — Mahmoud Gimie
(74) *Attorney, Agent, or Firm* — Nixon & Vanderhye P.C.

(57) ABSTRACT

A primary metal terminal connects between a fuel pump and a drive circuit through a resin lid. A primary connecting point of the primary metal terminal connected to the drive circuit, is positioned around a drive control IC, and a primary exposed portion of the primary metal terminal, exposed to a receiving space of the resin lid is bent such that the primary exposed portion is resiliently deformable. A secondary metal terminal connects between an external circuit system and the drive circuit through the resin lid. A secondary connecting point of the secondary metal terminal connected to the drive circuit is positioned at a location that is further spaced from the drive control IC in comparison to the primary connecting point, and a secondary exposed portion of the secondary metal terminal exposed to the receiving space has a stiffness higher than a stiffness of the primary exposed portion.

8 Claims, 11 Drawing Sheets

(51) Int. Cl.
  *F02M 37/14* (2006.01)
  *F02M 37/30* (2019.01)
  *F02M 37/10* (2006.01)
  *F02D 33/00* (2006.01)
  *F02M 37/08* (2006.01)
  *F02M 25/08* (2006.01)

(52) U.S. Cl.
  CPC .......... *F02M 37/08* (2013.01); *F02M 37/103* (2013.01); *F02M 37/14* (2013.01); *F02M 37/30* (2019.01); *B60K 2015/03243* (2013.01); *B60K 2015/03467* (2013.01); *F02M 25/089* (2013.01); *F02M 2037/085* (2013.01)

(58) Field of Classification Search
  CPC ...... F02M 37/30; F02M 37/08; F02M 37/103; F02M 37/14; F02M 2037/085; F02M 25/089; F02D 33/003
  USPC .................................................. 123/497, 509
  See application file for complete search history.

(56) References Cited

U.S. PATENT DOCUMENTS

| | | | | |
|---|---|---|---|---|
| 2011/0192381 A1* | 8/2011 | Maruyama | ............ | F02M 37/08 123/497 |
| 2012/0000556 A1* | 1/2012 | Baek | .................... | F02M 37/103 137/565.17 |
| 2012/0268854 A1* | 10/2012 | Schmidtlein | ......... | H01H 37/761 361/103 |
| 2013/0141941 A1* | 6/2013 | Matsui | ................. | G02B 6/0073 362/612 |
| 2014/0318646 A1* | 10/2014 | Song | ................... | F02D 41/3082 137/560 |
| 2016/0252058 A1* | 9/2016 | Park | ...................... | F02M 37/04 137/565.17 |

* cited by examiner (a)

(b)

TANK LID UNIT AND FUEL SUPPLY DEVICE

CROSS REFERENCE TO RELATED APPLICATION

This application is the U.S. national phase of International Application No. PCT/JP2016/084441 filed Nov. 21, 2016 which designated the U.S. and claims priority to Japanese Patent Application No. 2015-243348 filed on Dec. 14, 2015, the entire contents of each of which are hereby incorporated by reference.

TECHNICAL FIELD

The present disclosure relates to a tank lid unit and a fuel supply device.

BACKGROUND ART

In a fuel supply device, which includes a fuel pump to supply fuel from an inside of a fuel tank to an outside of the fuel tank, a tank lid unit is installed to a through-hole of the fuel tank. The patent literature 1 discloses a tank lid unit that includes a drive circuit, which drives the fuel pump placed in the fuel tank according to a control operation of an external circuit system.

Specifically, in the tank lid unit of the patent literature 1, a resin lid, which closes the through-hole of the fuel tank, receives the drive circuit in a receiving space that is formed in an inside of the resin lid. Metal terminals, which are configured to connect between the fuel pump and the drive circuit through the resin lid, are respectively made of metal and respectively extend in a form of L-shape. Furthermore, metal terminals, which are configured to connect between the external circuit system and the drive circuit through the resin lid, are also respectively made of metal and respectively extend in a form of L-shape.

In the tank lid unit of the patent literature 1, a portion of each of the metal terminals is embedded in the resin lid, and another portion of the metal terminal is covered with a resin portion that fills the receiving space. Therefore, a difference in the amount of thermal deformation caused by thermal expansion and contraction is generated between the resin lid, which includes the resin portion, and the metal terminal. Thus, a stress, which is applied to a connecting point between the metal terminal and the drive circuit, changes in response to the thermal expansion and contraction. Here, particularly in a case where the connecting point of the metal terminal is set at a location around a heat generating element of the drive circuit, the amount of change in the stress is increased at the connecting point of the metal terminal, which is likely to receive the heat from the heat generating element located around the connecting point of the metal terminal. This kind of change in the stress may cause a connection failure between the metal terminal and the drive circuit and is thereby not desirable in view of the durability.

CITATION LIST

Patent Literature

Patent Literature 1: JP2011-163212A (corresponding to US2011/0192381A1)

SUMMARY OF INVENTION

The present disclosure is made to address the above-described disadvantage, and it is an objective of the present disclosure to provide a tank lid unit and a fuel supply device, which can ensure the durability.

In order to address the above objective, according to one aspect of the present disclosure, there is provided a tank lid unit that is configured to be installed to a through-hole of a fuel tank and internally includes a drive circuit, which has a heat generating element, to drive a fuel pump received in an inside of the fuel tank according to a control operation of an external circuit system, the tank lid unit including:

a resin lid that is made of resin and closes the through-hole, wherein the resin lid receives the drive circuit in a receiving space formed in an inside of the resin lid;

a primary metal terminal that is made of metal and is configured to connect between the fuel pump and the drive circuit through the resin lid, wherein a primary connecting point of the primary metal terminal, which is connected to the drive circuit, is set at a location around the heat generating element, and a primary exposed portion of the primary metal terminal, which is exposed to the receiving space, is bent such that the primary exposed portion is resiliently deformable; and a secondary metal terminal that is made of metal and is configured to connect between the external circuit system and the drive circuit through the resin lid, wherein a secondary connecting point of the secondary metal terminal, which is connected to the drive circuit, is set at a location that is further spaced from the heat generating element in comparison to the primary connecting point, and a secondary exposed portion of the secondary metal terminal, which is exposed to the receiving space, has a higher stiffness that is higher than a stiffness of the primary exposed portion.

In order to address the above objective, according to another aspect of the present disclosure, there is provided a fuel supply device including:

a fuel pump that is configured to supply fuel from an inside to an outside of a fuel tank; and a tank lid unit that is installed to a through-hole of the fuel tank and internally includes a drive circuit, which has a heat generating element, to drive the fuel pump received in the inside of the fuel tank according to a control operation of an external circuit system, wherein:

the tank lid unit includes:
  a resin lid that is made of resin and closes the through-hole, wherein the resin lid receives the drive circuit in a receiving space formed in an inside of the resin lid;
  a primary metal terminal that is made of metal and is configured to connect between the fuel pump and the drive circuit through the resin lid, wherein a primary connecting point of the primary metal terminal, which is connected to the drive circuit, is set at a location around the heat generating element, and a primary exposed portion of the primary metal terminal, which is exposed to the receiving space, is bent such that the primary exposed portion is resiliently deformable; and
  a secondary metal terminal that is made of metal and is configured to connect between the external circuit system and the drive circuit through the resin lid, wherein a secondary connecting point of the secondary metal terminal, which is connected to the drive circuit, is set at a location that is further spaced from the heat generating element in comparison to the primary connecting point, and a secondary exposed portion of the secondary metal terminal, which is exposed to the receiving space, has a higher stiffness that is higher than a stiffness of the primary exposed portion.

According to the above aspects, in the primary metal terminal, which is configured to connect between the fuel pump and the drive circuit through the resin lid, the primary connecting point, which is connected to the drive circuit, is set at the location around the heat generating element of the drive circuit. In the primary metal terminal, which has the primary connecting point set at the above-described location, the primary exposed portion, which is exposed to the receiving space in the resin lid, is bent such that the primary exposed portion is resiliently deformable. With this construction, in the primary metal terminal, which is likely to receive the heat from the heat generating element located around the primary metal terminal, the primary exposed portion is resiliently deformed in response to thermal expansion and contraction, so that the amount of change in the stress applied to the primary connecting point can be reduced.

Furthermore, at the secondary metal terminal, which is configured to connect between the external circuit system and the drive circuit through the resin lid, the secondary connecting point, which is connected to the drive circuit, is set at the location that is further spaced from the heat generating element in comparison to the primary connecting point. Thereby, in the secondary metal terminal, which has the secondary connecting point set at the above-described location, the secondary exposed portion, which is exposed to the receiving space of the resin lid, is formed to have the higher stiffness that is higher than the stiffness of the primary exposed portion. Accordingly, in the secondary metal terminal, which is less likely to receive the heat from the heat generating element that is spaced from the secondary metal terminal, even though the secondary exposed portion has the high stiffness, the stress, which is applied to the secondary connecting point in response to the thermal expansion and contraction, is reduced.

Therefore, at the primary and secondary connecting points, it is possible to limit the generation of connection failure by limiting the change in the stress, and thereby it is possible to ensure the durability.

DESCRIPTION OF EMBODIMENTS

Hereinafter, an embodiment of the present disclosure will be described with reference to the accompanying drawings.

Figure 1:
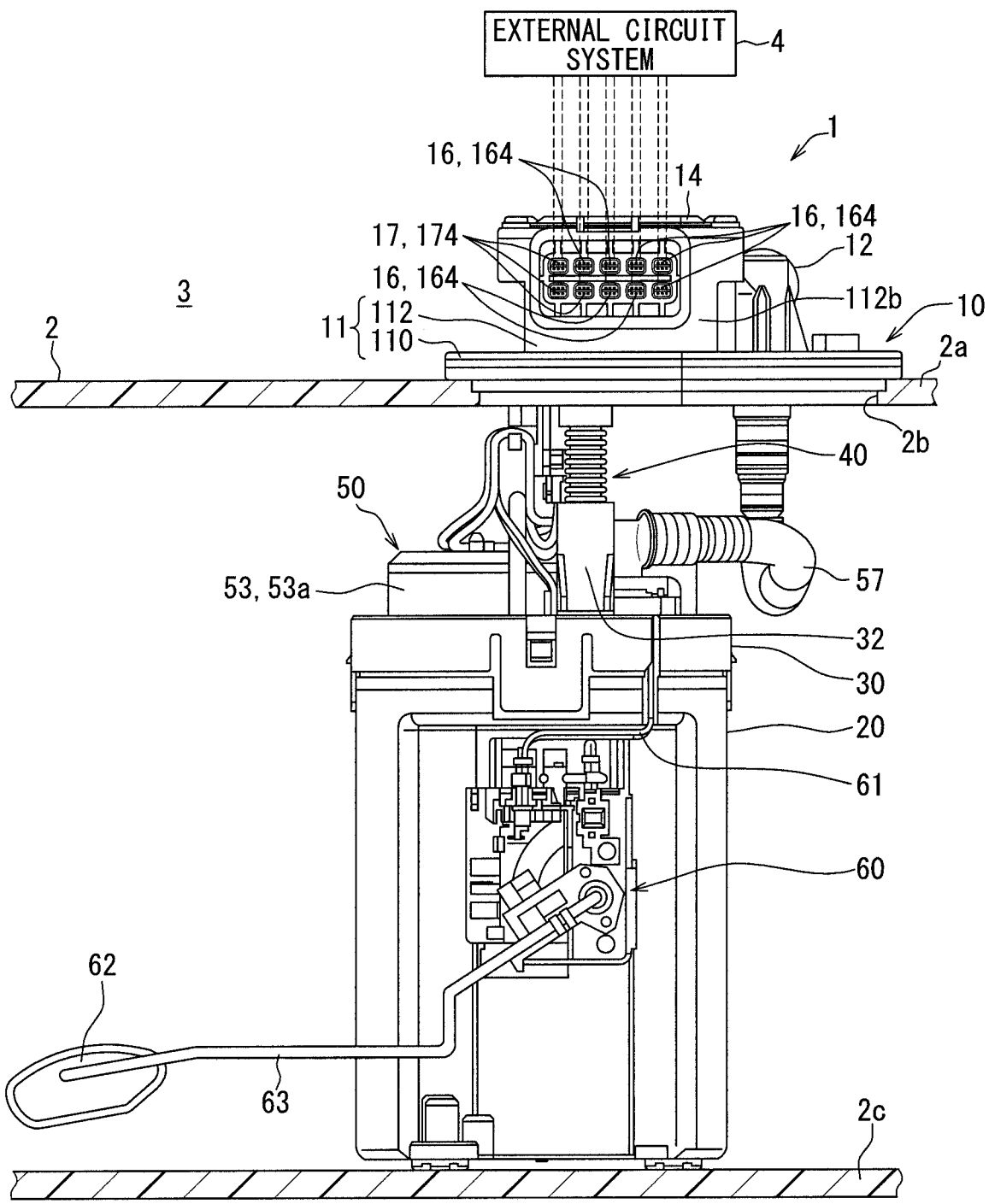
FIG. 1 is a side view showing a fuel supply device according to a first embodiment.
Figure 2:
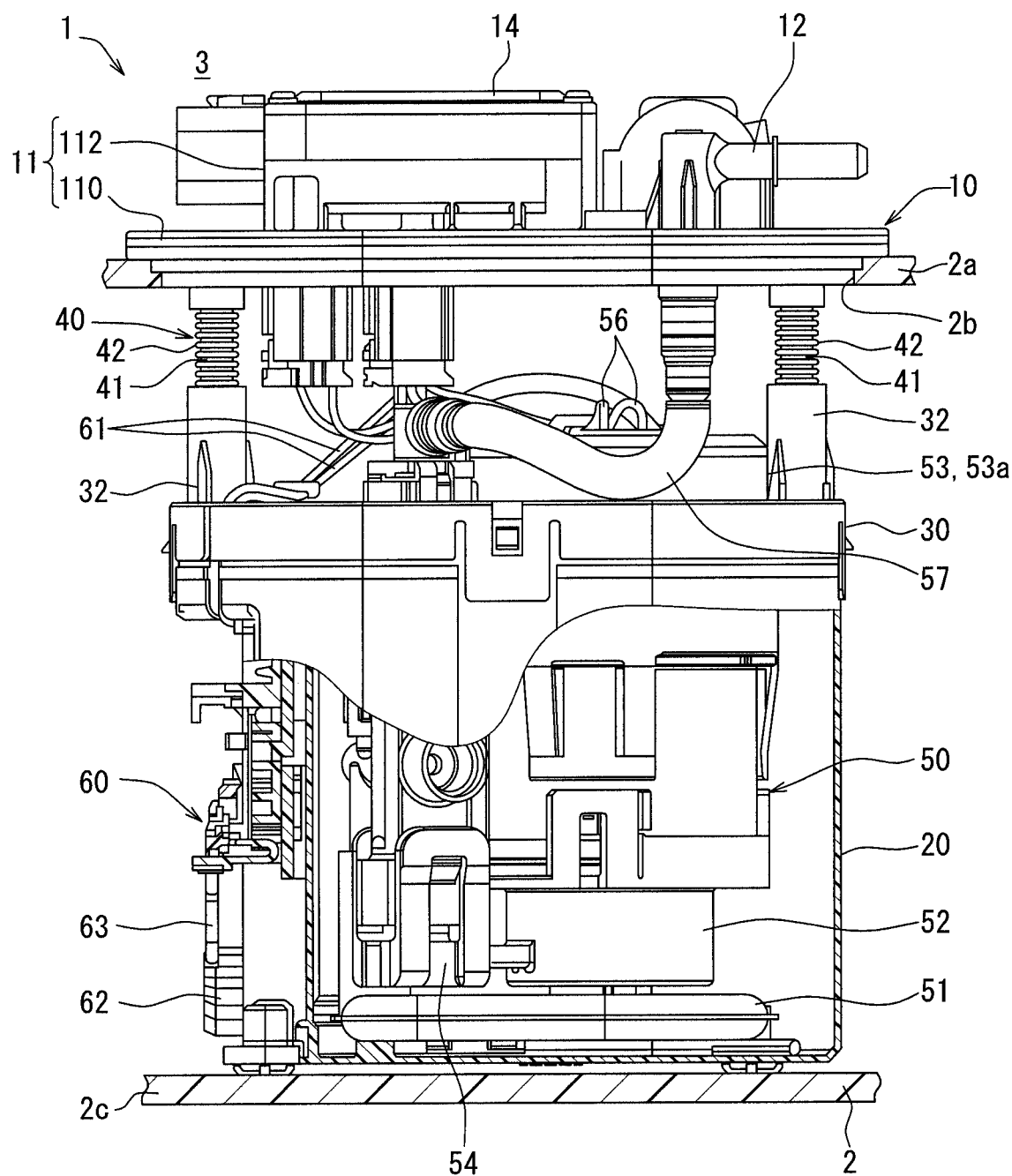
FIG. 2 is a partially fragmented front view showing the fuel supply device shown in FIG. 1.
Figure 3:
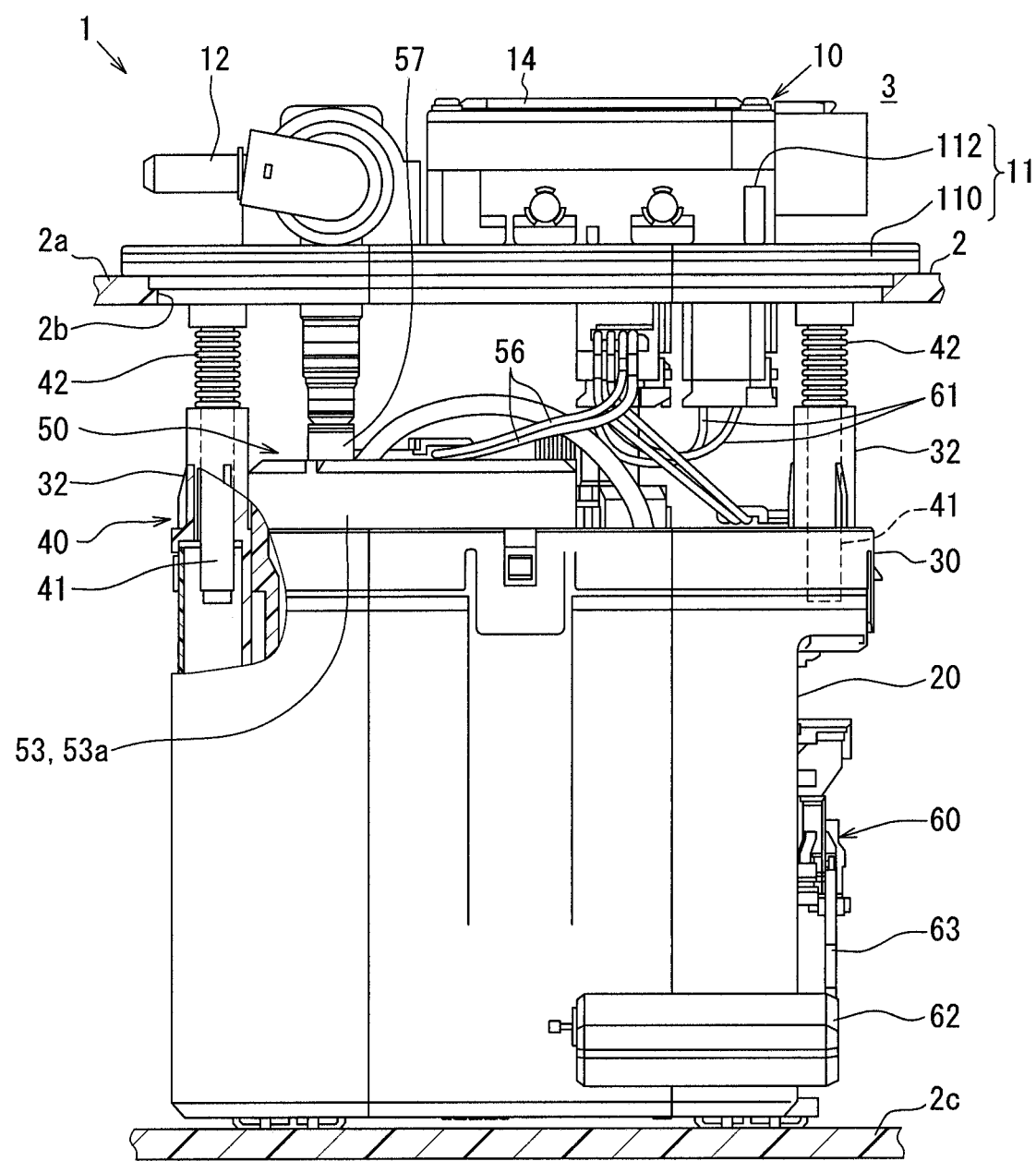
FIG. 3 is a back view showing the fuel supply device shown in FIG. 1.
Figure 4:
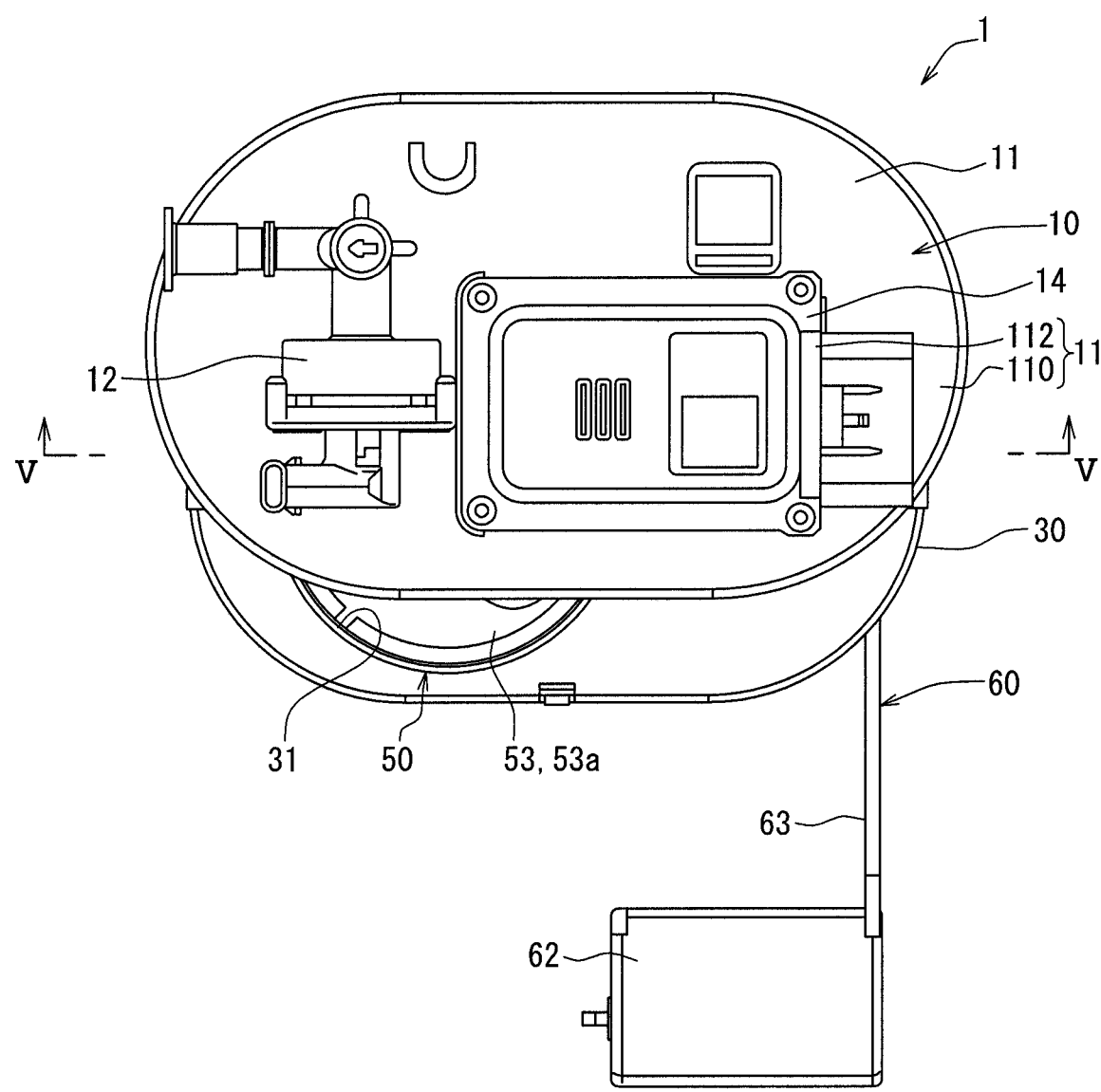
FIG. 4 is a top view showing the fuel supply device shown in FIG. 1.

As shown in FIGS. 1 to 3, a fuel supply device 1 of the embodiment of the present disclosure is installed to a fuel tank 2 of a vehicle. The device 1 supplies the fuel from an inside of the fuel tank 2 to an internal combustion engine located at an outside of the fuel tank 2. The fuel tank 2 is made of resin and is shaped into a hollow form to store the fuel. The internal combustion engine, to which the fuel is supplied from the device 1, may be a gasoline engine or a diesel engine. In FIGS. 1 to 3, which show an installation state of the device 1 at the fuel tank 2, a top-to-bottom direction and a lateral direction coincide with a vertical direction and a horizontal direction of the vehicle that is placed on a horizontal plane.

(Overall Structure)

First of all, an overall structure of the device 1 will be described. The device 1 includes a tank lid unit 10, a sub-tank 20, a holding cover 30, an adjuster mechanism 40, a pump unit 50 and a liquid level detection unit 60. The components 20, 30, 40, 50, 60 of the device 1, which are other than the tank lid unit 10, are received in an inside of the fuel tank 2.

The tank lid unit 10 is installed to a through-hole 2b that penetrates through a top plate portion 2a of the fuel tank 2. As shown in FIGS. 1 to 5, the tank lid unit 10 includes a resin lid 11, a fuel pipe 12, a drive circuit 13, a heat dissipation cover 14, a plurality of primary metal terminals 15, a plurality of secondary metal terminals 16 and a plurality of tertiary metal terminals 17.

The resin lid 11 has a flange 110 and a circuit housing 112, which are integrally formed in one piece from resin. The resin material of the resin lid 11 may be permeable resin, through which fuel vapor permeates, such as polyacetal resin (POM) that is excellent in fuel resistance. By using the permeable resin, the fuel vapor, which is generated through vaporization of the fuel in the fuel tank 2, can permeate through the resin lid 11.

Figure 5:
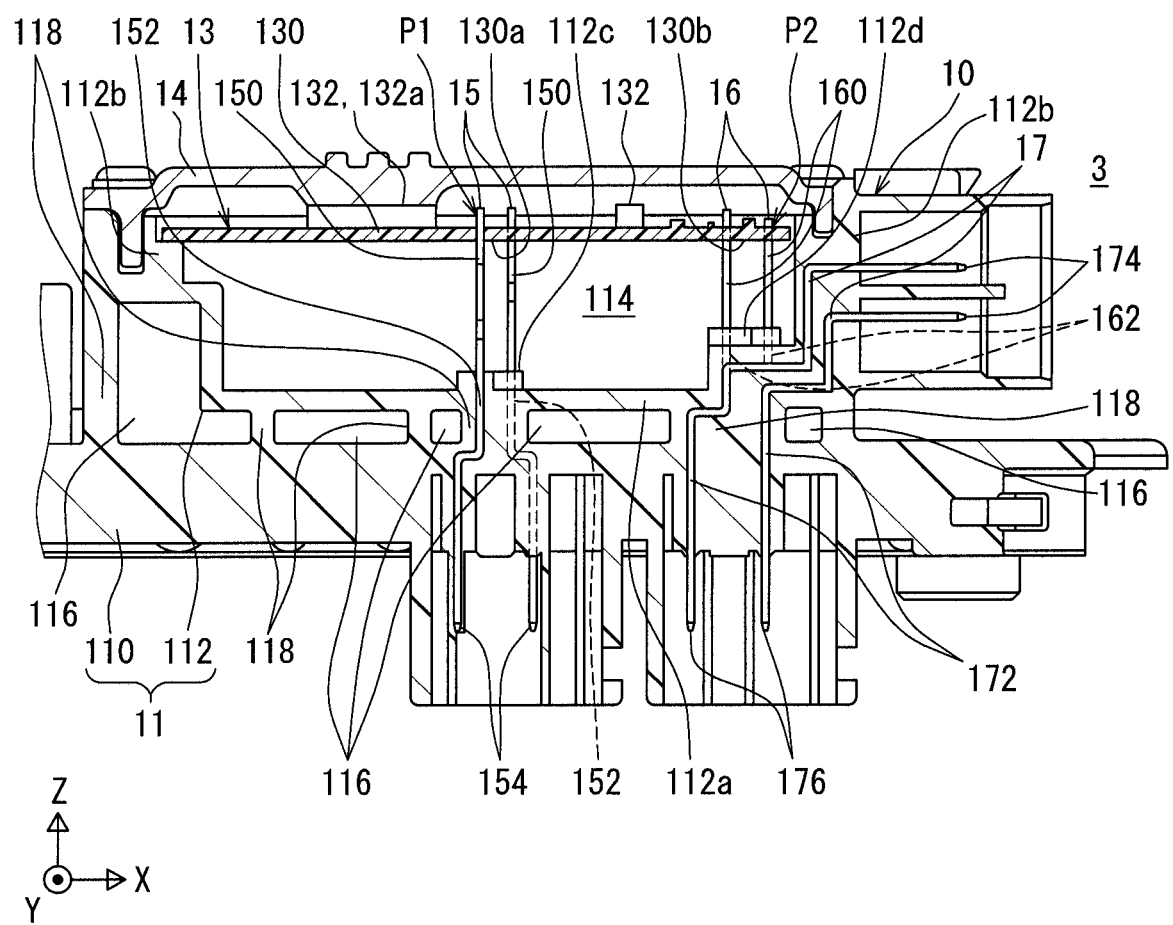
FIG. 5 is a cross-sectional view taken along line V-V in FIG. 4.

The flange 110 is made of the permeable resin and is shaped into a circular plate form. The flange 110 is fitted to the through-hole 2b from the outside of the fuel tank 2, so that the flange 110 closes the through-hole 2b. The circuit housing 112 is made of the permeable resin and is shaped into a bottomed rectangular tubular form. An inner space of the circuit housing 112 is defined as a receiving space 114. The circuit housing 112 is placed on an upper side of the flange 110 and is thereby placed at the outside of the fuel tank 2. As shown in FIG. 5, the circuit housing 112 forms a plurality of ventilation spaces 116 that open at a location between the circuit housing 112 and the flange 110. Each ventilation space 116 communicates with an outside space 3 that is located at the outside of the fuel tank 2 and the circuit housing 112. The fuel vapor, which is generated in the inside of the fuel tank 2 and permeates through the flange 110, is released to the outside space 3 through the ventilation spaces 116. Thereby, permeation of the fuel vapor into the receiving space 114 through a bottom portion 112a of the circuit housing 112 is limited.

As shown in FIGS. 1 to 4, the fuel pipe 12 is formed integrally with the resin lid 11 in one piece from the permeable resin such that the fuel pipe 12 is in a form of a tube that extends from the upper side to the lower side of the flange 110. The fuel pipe 12 projects from the upper side of the flange 110 to the outside space 3, so that the fuel pipe 12 is communicated with a supply passage that supplies the fuel to the internal combustion engine. Furthermore, the fuel pipe 12 projects from the lower side of the flange 110 into the fuel tank 2, so that the fuel pipe 12 is communicated with a fuel filter 53 of the pump unit 50.

As shown in FIG. 5, the drive circuit 13 is an electronic circuit that drives a fuel pump 52 of the pump unit 50 and is received in the receiving space 114 located in the inside of the resin lid 11. The drive circuit 13 has a circuit board 130 and circuit elements 132. The circuit board 130 is a printed wiring board, such as a glass epoxy board, and is shaped into a flat plate form. The circuit board 130 is held by a side portion 112b of the circuit housing 112, so that the circuit board 130 partitions the receiving space 114 into an upper part and a lower part and is spaced from the bottom portion 112a of the circuit housing 112. The circuit board 130, which is held in this holding state, is offset to the upper side in the receiving space 114. The circuit elements 132 are installed to both sides or one side of the circuit board 130. Besides a drive control IC 132a, the circuit elements 132 include, for example, a chip capacitor and a resistor element. The drive control IC 132a drives the fuel pump 52 based on a control signal that is received from an external circuit system 4, such as an ECU, shown in FIG. 1. The drive control IC 132a, which generates heat at the time of driving the fuel pump 52, is a heat generating element that has the largest calorific value among all of the circuit elements 132.

With reference to FIGS. 1 to 5, a heat dissipation cover 14 is formed into a rectangular lid form and is made of metal, such as aluminum, which has excellent heat dissipation properties. The heat dissipation cover 14 is fitted to an upper end opening of the circuit housing 112 such that the heat dissipation cover 14 closes the upper end opening of the circuit housing 112 and covers the upper part of the receiving space 114. The circuit housing 112 cooperates with the heat dissipation cover 14, which is in this closing form, to liquid tightly and gas tightly separate the receiving space 114 from the outside space 3, thereby protecting the drive circuit 13 received in the receiving space 114. Here, the receiving space 114 is filled with a thermal gel, such as an epoxy gel (not shown). As shown in FIG. 5, the heat dissipation cover 14 contacts the drive control IC 132a, which has the largest calorific value, through the thermal gel to implement the heat releasing function.

The primary metal terminals 15 are arranged one after another and are spaced from each other. Each primary metal terminal 15 is formed into an elongated bent plate form with metal, such as tin-plated brass, which has excellent fuel resistance. Each primary metal terminal 15 extends through the flange 110 and the bottom portion 112a of the circuit housing 112 at the resin lid 11 such that the primary metal terminal 15 connects between the fuel pump 52 and the drive circuit 13.

Each primary metal terminal 15 has a primary exposed portion 150, a primary embedded portion 152 and a primary projecting portion 154. Specifically, the primary exposed portion 150 is exposed in the receiving space 114 and is thereby electrically connected to the circuit board 130. The primary embedded portion 152 is embedded such that the primary embedded portion 152 extends from the flange 110 to the bottom portion 112a of the circuit housing 112. Particularly, the primary embedded portion 152 of the present embodiment is also embedded in a partition wall 118 of the flange 110 that partitions between corresponding adjacent two of the ventilation spaces 116. The primary projecting portion 154 projects into the lower side that is the inside of the fuel tank 2 such that the primary projecting portion 154 is electrically connected to the fuel pump 52.

As shown in FIGS. 1 and 5, the secondary metal terminals 16 are arranged one after another and are spaced from each other. Similar to the primary metal terminals 15, each secondary metal terminal 16 is formed into an elongated bent plate form with metal, such as tin-plated brass, which has the excellent fuel resistance. Each secondary metal terminal 16 extends through the bottom portion 112a and the side portion 112b of the circuit housing 112 at the resin lid 11 such that the secondary metal terminal 16 connects between the external circuit system 4 and the drive circuit 13.

Each secondary metal terminal 16 has a secondary exposed portion 160, a secondary embedded portion 162 and a secondary projecting portion 164. Specifically, the secondary exposed portion 160 is exposed in the receiving space 114 and is thereby electrically connected to the circuit board 130. The secondary embedded portion 162 is embedded such that the secondary embedded portion 162 extends from the bottom portion 112a to the side portion 112b at the circuit housing 112. The secondary projecting portion 164 projects to the outside space 3 in the lateral direction such that the secondary projecting portion 164 is used to electrically connect to the external circuit system 4. With the above-described construction of each secondary metal terminal 16 and the above-described construction of each primary metal terminal 15, the fuel pump 52 is driven by the drive circuit 13 in response to the control operation of the external circuit system 4.

The tertiary metal terminals 17 are arranged one after another and are spaced from each other. Similar to the primary metal terminals 15, each tertiary metal terminal 17 is formed into an elongated bent plate form with metal, such as tin-plated brass, which has the excellent fuel resistance. Each tertiary metal terminal 17 extends through the flange 110, the bottom portion 112a and the side portion 112b of the circuit housing 112 at the resin lid 11 such that the tertiary metal terminal 17 connects between the external circuit system 4 and the liquid level detection unit 60.

Each tertiary metal terminal 17 has a tertiary embedded portion 172 and tertiary projecting portions 174, 176. Specifically, the tertiary embedded portion 172 is embedded such that the tertiary embedded portion 172 extends from the flange 110 to the bottom portion 112a and the side portion 112b of the circuit housing 112. Particularly, the tertiary embedded portion 172 of the present embodiment is also embedded in the partition wall 118. The tertiary projecting portion 174 at the upper side projects in the lateral direction and is thereby exposed in the outside space 3, so that the tertiary projecting portion 174 is used to electrically connect with the external circuit system 4. The tertiary projecting portion 176 at the lower side projects into the lower side that is the inside of the fuel tank 2 such that the tertiary projecting portion 176 is electrically connected to the liquid level detection unit 60. With the above-described construction of each tertiary metal terminal 17, the external circuit system 4 receives a measurement signal, which is outputted from the liquid level detection unit 60, and thereby the external circuit system 4 senses the surface level of the fuel in the fuel tank 2.

With reference to FIGS. 1 to 3, the sub-tank 20 is made of resin and is shaped into a cylindrical tubular form having a bottom. The sub-tank 20 is placed on a bottom plate portion 2c of the fuel tank 2. The sub-tank 20 stores the fuel, which is transferred from the inside of the fuel tank 2.

With reference to FIGS. 1 to 4, the holding cover 30 is made of resin and is shaped into a circular lid form. The holding cover 30 is fitted to an upper end opening of the sub-tank 20, so that the holding cover 30 closes the upper end opening of the sub-tank 20. The holding cover 30 has two receiving portions 32, which respectively project upwardly in a cylindrical tubular form and are respectively located on two opposite sides of a holding hole 31. Furthermore, with reference to FIGS. 1 to 3, the holding cover 30 also has the holding hole 31 that extends through the holding cover 30 in the top-to-bottom direction.

The adjuster mechanism 40 includes two support columns 41 and two resilient members 42. Each support column 41 is made of metal and is shaped into a cylindrical tubular form such that the support column 41 extends in the top-to-bottom direction. An upper end portion of each support column 41 is fitted to a lower portion of the flange 110. The support columns 41 are inserted into the receiving portions 32, respectively, on the lower side of the upper end portions of the support columns 41. With this inserting configuration, the support columns 41 are slidable in the top-to-bottom direction relative to the holding cover 30. Each resilient member 42 is in a form of a coil spring made of metal and is interposed between the corresponding receiving portion 32 and the flange 110. Each resilient member 42 is resiliently deformed in response to a relative position between the receiving portion 32 and the flange 110 and thereby exerts a restoring force. As a result of the generation of this restoring force, each resilient member 42 urges the sub-tank 20, which is integrally joined to the holding cover 30, toward the bottom plate portion 2c placed at the lower side of the fuel tank 2.

As shown in FIGS. 1 to 4, the pump unit 50 is received in the inside of the sub-tank 20 except an upper portion of the pump unit 50. The pump unit 50 includes a suction filter 51, the fuel pump 52, a fuel filter 53 and a relief valve 54.

As shown in FIG. 2, the suction filter 51 is placed at the lowest portion of the pump unit 50. The suction filter 51 is joined to a suction inlet of the fuel pump 52. The suction filter 51 filters the fuel to be suctioned from the inside of the sub-tank 20 to the fuel pump 52, so that the suction filter 51 removes large foreign objects contained in the fuel. The fuel pump 52 is placed on the upper side of the suction filter 51 at the pump unit 50. The fuel pump 52 is electrically connected to the primary metal terminals 15 through a flexible wiring 56 that is flexible. With this electrical connection, the fuel pump 52 is operated in response to a drive control operation of the drive circuit 13, so that the fuel pump 52 pressurizes and discharges the fuel suctioned from the suction filter 51. At this time, the fuel pump 52 variably adjusts the pressure of the fuel discharged from the fuel pump 52 in response to the drive control operation of the drive circuit 13.

As shown in FIGS. 1 to 4, the fuel filter 53 is placed around the fuel pump 52 at the pump unit 50. The fuel filter 53 includes a filter element (not shown), which is, for example, a honeycomb filter material and is received in an inside of a filter case 53a. The filter case 53a is held by an inner peripheral portion of the holding hole 31 in a state where the filter case 53a extends through the holding cover 30 in the top-to-bottom direction. The filter case 53a is communicated with a discharge outlet of the fuel pump 52. Furthermore, as shown in FIGS. 1 to 3, the filter case 53a is communicated with the fuel pipe 12 through a flexible tube 57 that is flexible. With this communicating configuration, the fuel filter 53 filters the fuel, which is discharged from the fuel pump 52 into the inside of the filter case 53a and is directed to the fuel pipe 12, so that the fuel filter 53 removes fine foreign objects contained in the fuel.

As shown in FIG. 2, in the pump unit 50, the relief valve 54 is placed at a lateral side of the fuel filter 53. The relief valve 54 is communicated with a fuel passage that extends in the filter case 53a toward the fuel pipe 12. The relief valve 54 releases the pressure of the fuel when the pressure of the fuel, which is supplied to the fuel pipe 12 through the fuel filter 53, becomes equal to or larger than a preset pressure.

As shown in FIGS. 1 to 4, the liquid level detection unit 60 is installed to an outer peripheral portion of the sub-tank 20. In the present embodiment, the liquid level detection unit 60 is a sender gauge. The liquid level detection unit 60 is electrically connected to the tertiary metal terminals 17 through a flexible wiring 61 that is flexible. In the liquid level detection unit 60, a float 62, which floats on the fuel in the fuel tank 2, moves up and down, so that an arm 63 is rotated. At this time, a rotational position of the arm 63 corresponds to the surface level of the fuel in the fuel tank 2. Therefore, the liquid level detection unit 60 outputs a measurement signal, which indicates the rotational position of the arm 63, to the external circuit system 4.

(Detailed Structure)

Figure 7:
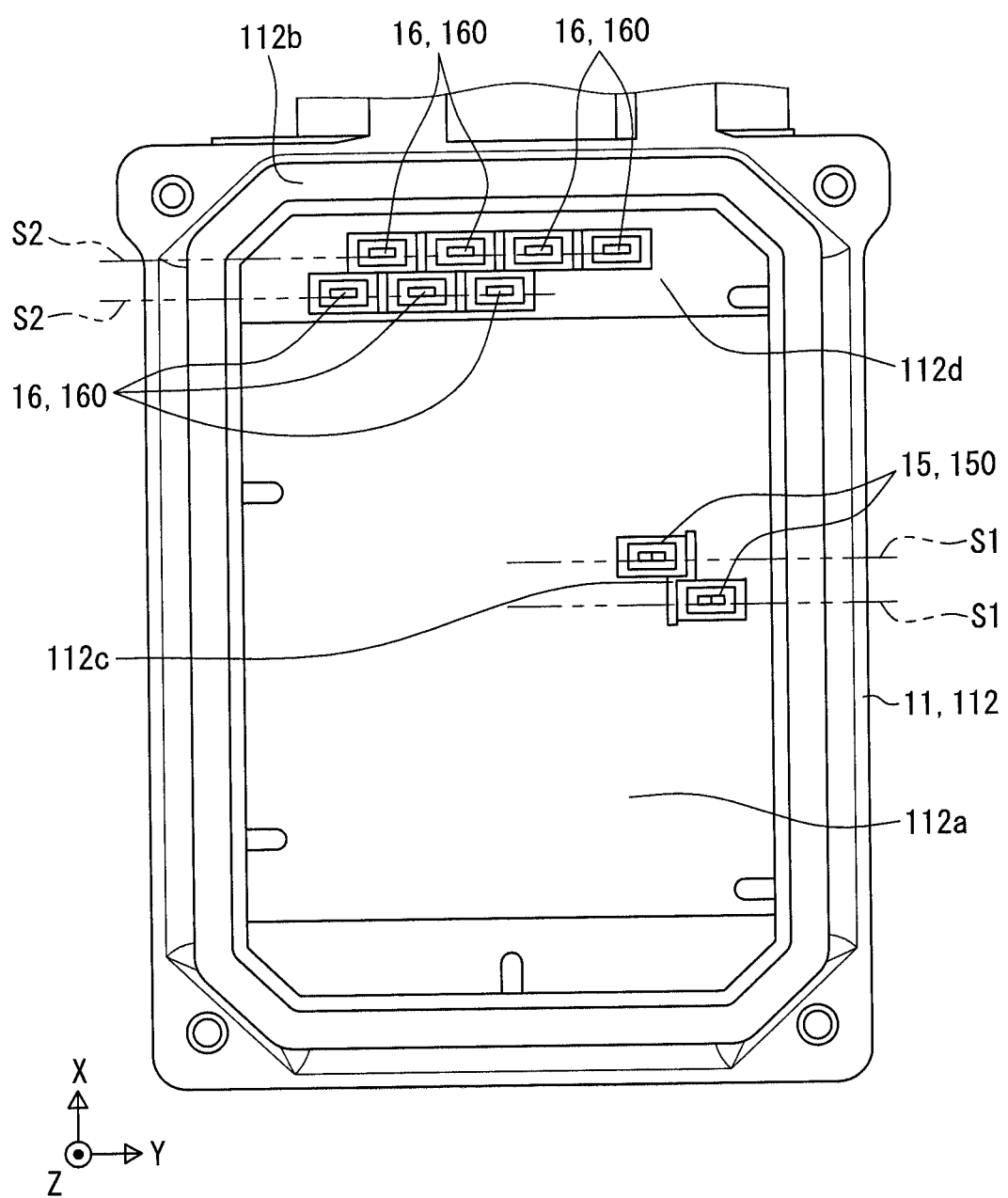
FIG. 7 is a top view showing an inside of the circuit housing shown in FIG. 5.

Next, a detailed structure of the device 1 will be described. In the following description, among the lateral directions, each of a left-to-right direction in FIG. 5 and a top-to-bottom direction in FIG. 7 is defined as an X-direction. Furthermore, among the lateral directions, a left-to-right direction, which is perpendicular to the X-direction in FIGS. 7 and 8, will be defined as a Y-direction. Additionally, a top-to-bottom direction, which is perpendicular to the X and Y directions in FIGS. 5 and 8, will be defined as a Z-direction.

As shown in FIG. 7, each primary metal terminal 15 has the primary exposed portion 150. The primary exposed portion 150 is shaped into a planar plate form, which has a constant thickness and extends along a corresponding imaginary reference plane S1 that is perpendicular to the X-direction among the lateral directions. The primary embedded portion 152 of each primary metal terminal 15 is embedded in a center part 112c of the bottom portion 112a of the circuit housing 112 while the center part 112c is centered at the bottom portion 112a in the X-direction that is perpendicular to the reference plane S1. Each primary metal terminal 15 connects the fuel pump 52 to the drive circuit 13, which is located on the upper side of the fuel pump 52, through the center part 112c, in which the primary metal terminals 15 are embedded in the above-described manner.

Figure 6:
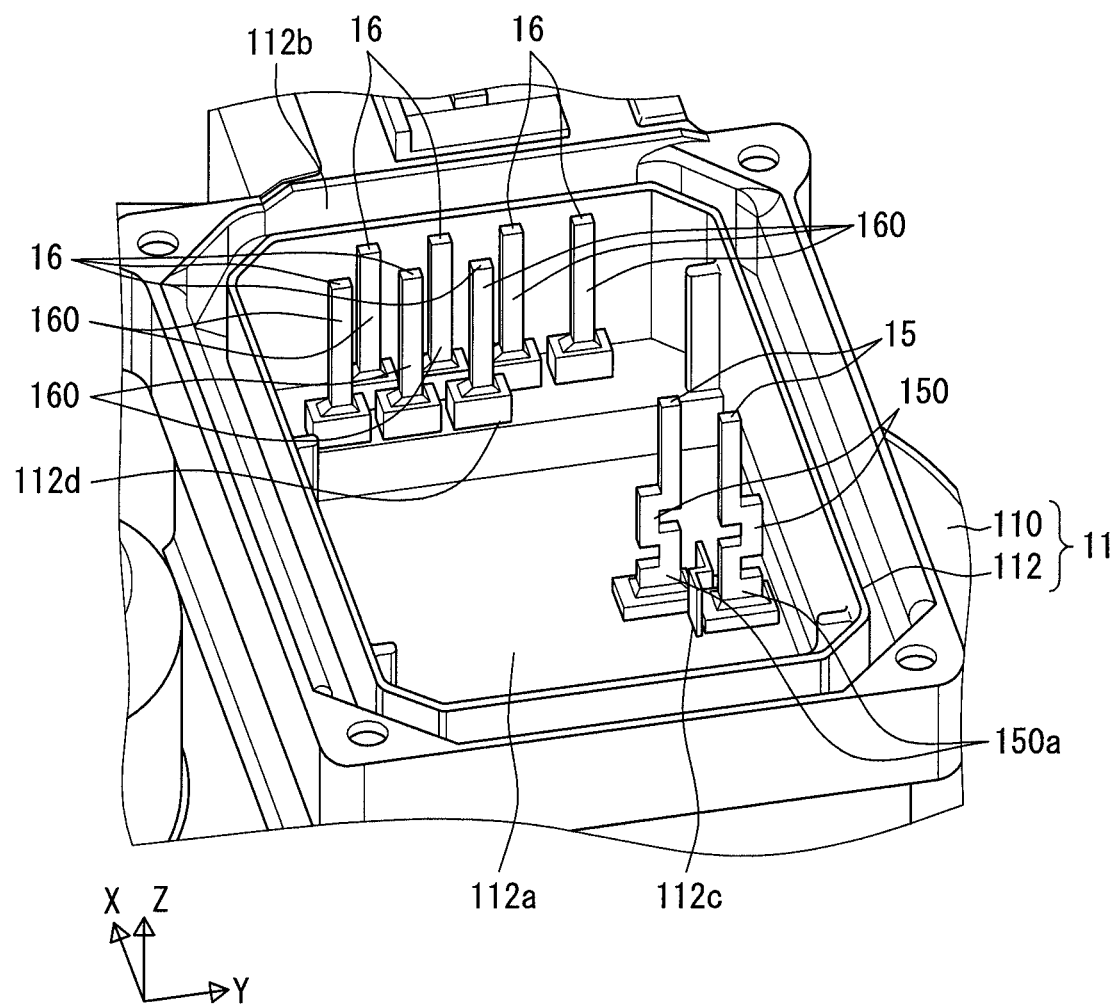
FIG. 6 is a perspective view showing an inside of a circuit housing shown in FIG. 5.
Figure 8:
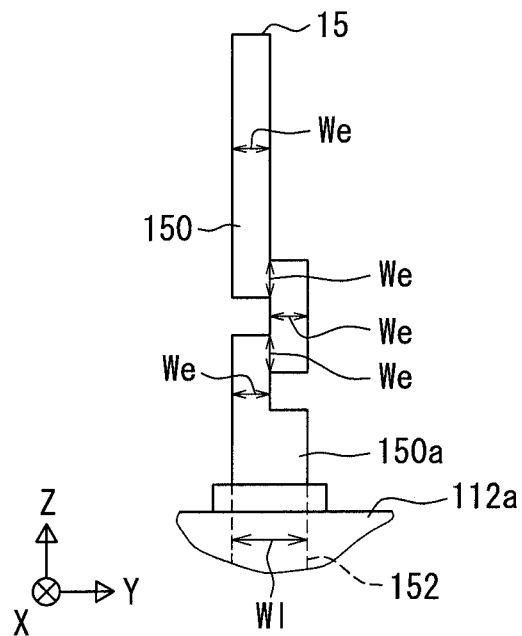
FIG. 8 is a side view of a primary metal terminal shown in FIG. 5.

The primary exposed portion 150 of each primary metal terminal 15 is connected to the circuit board 130 of the drive circuit 13 at a corresponding primary connecting point P1 while the primary connecting point P1 is set at a corresponding location, which is around the drive control IC 132a at a center part 130a of the circuit board 130. The primary exposed portion 150 of each primary metal terminal 15 is bent at a plurality of locations along the corresponding reference plane S1 and thereby extends in a meandering form, as shown in FIGS. 6 and 8. Particularly, the primary exposed portion 150 of the present embodiment is alternately bent in the Y-direction and the Z-direction at the plurality of locations, so that the primary exposed portion 150 meanders from the fuel pump 52 side to the drive circuit 13 side. Because of the above-described meandering form, the primary exposed portion 150 of each primary metal terminal 15 is resiliently deformable at the bent locations along the reference plane S1.

At least an upper end part of the primary embedded portion 152 of each primary metal terminal 15 extends along the corresponding reference plane S1 shown in FIG. 7 such that the upper end part of the primary embedded portion 152 has a predetermined embedded width WI along the reference plane S1. In contrast, the primary exposed portion 150 of each primary metal terminal 15 has an exposed width We (the exposed width We being smaller than the embedded width WI as shown in FIG. 8) and extends in the meandering form (in other words, a crank form) except a boundary vicinity portion 150a of the primary exposed portion 150, which is adjacent to a boundary between the primary exposed portion 150 and the primary embedded portion 152. The boundary vicinity portion 150a of the primary exposed portion 150 has a width that is substantially the same as the embedded width WI.

As shown in FIG. 7, each secondary metal terminal 16 has a secondary exposed portion 160. The secondary exposed portion 160 is shaped into a planar plate form, which has a constant thickness and extends along a corresponding imaginary reference plane S2 that is perpendicular to the X-direction among the lateral directions. The secondary embedded portion 162 of each secondary metal terminal 16 is embedded in an edge portion 112d of the bottom portion 112a of the circuit housing 112 located at an end of the bottom portion 112a in the X-direction that is perpendicular to the reference plane S1. With the above-described embedded form, each secondary metal terminal 16 is placed closer to the side portion 112b of the circuit housing 112 in comparison to the primary embedded portion 152 in the X-direction that is perpendicular to the reference plane S1, so that the secondary metal terminal 16 can connect between the external circuit system 4 and the drive circuit 13.

The secondary exposed portion 160 of each secondary metal terminal 16 is connected to the circuit board 130 of the drive circuit 13 at a corresponding secondary connecting point P2 while the secondary connecting point P2 is set at a corresponding location, which is further spaced from the drive control IC 132a in comparison to the primary connecting point P1 of each primary metal terminal 15 at the edge portion 130b of the circuit board 130. The secondary exposed portion 160 of each secondary metal terminal 16 extends straight in the top-to-bottom direction as shown in FIG. 6 along the corresponding reference plane S2 as shown in FIG. 7. With this extending configuration, the stiffness of the secondary exposed portion 160 in the Y direction and the Z-direction is set to be higher than the stiffness of the primary exposed portion 150 that is shaped into the meandering form and is resiliently deformable.

As shown in FIG. 5, a contact surface area of the primary embedded portion 152 of each primary metal terminal 15, which contacts the resin lid 11, is set to be larger than a contact surface area of the secondary embedded portion 162 of each secondary metal terminal 16, which contacts the resin lid 11. This is for the following reason. That is, in the present embodiment, the primary embedded portion 152 is embedded in the partition wall 118, which partitions between the corresponding adjacent ventilation spaces 116, and thereby the contact surface area of the primary embedded portion 152, which contacts the resin lid 11, is increased.

(Effects and Advantages)

Hereinafter, effects and advantages of the device 1 discussed above will be described.

According to the device 1, in each primary metal terminal 15, which is configured to connect between the fuel pump 52 and the drive circuit 13 through the resin lid 11, the primary connecting point P1 is set at the corresponding location that is around the drive control IC 132a (serving as the heat generating element) of the drive circuit 13. In the primary metal terminal 15, which has the primary connecting point P1 set at the above-described location, the primary exposed portion 150, which is exposed to the receiving space 114 of the resin lid 11, is bent such that the primary exposed portion 150 is resiliently deformable. In this way, in the primary metal terminal 15, which is likely to receive the heat from the drive control IC 132a located around the primary metal terminal 15, the primary exposed portion 150 is resiliently deformed in response to thermal expansion and contraction, so that the amount of change in the stress applied to the primary connecting point P1 can be reduced.

Furthermore, in the secondary metal terminal 16, which is configured to connect between the external circuit system 4 and the drive circuit 13 through the resin lid 11, the secondary connecting point P2, which is connected to the drive circuit 13, is set at the location that is further spaced from the drive control IC 132a in comparison to the primary connecting point P1. Thereby, in the secondary metal terminal 16, which has the secondary connecting point P2 set at the above-described location, the secondary exposed portion 160, which is exposed to the receiving space 114 of the resin lid 11, is formed to have the higher stiffness that is higher than the stiffness of the primary exposed portion 150. Here, particularly, it is ensured that the secondary exposed portion 160 of the device 1 has the higher stiffness, which is higher than the stiffness of the primary exposed portion 150, by the simple configuration of the secondary exposed portion 160 that extends straight. Accordingly, in the secondary metal terminal 16, which is less likely to receive the heat from the drive control IC 132a that is spaced from the secondary metal terminal 16, even though the secondary exposed portion 160 has the high stiffness, the stress, which is applied to the secondary connecting point P2 in response to the thermal expansion and contraction, is reduced.

Therefore, at the primary and secondary connecting points P1, P2, it is possible to limit the generation of connection failure by limiting the change in the stress, and thereby it is possible to ensure the durability.

Furthermore, according to the device 1, in the primary metal terminal 15, which is more likely to receive the heat from the drive control IC 132a located around the primary metal terminal 15, a difference in the amount of thermal deformation (hereinafter referred to as a thermal deformation amount difference) between the primary metal terminal 15 and the resin lid 11 caused by the thermal expansion and contraction tends to be increased due to the larger contact surface area of the primary metal terminal 15, which contacts the resin lid 11, in comparison to the contact surface area of the secondary metal terminal 16, which contacts the resin lid 11. However, even if the thermal expansion and contraction are generated, the amount of change in the stress applied to the primary connecting point P1 can be reliably reduced by the resilient deformation of the primary exposed portion 150 of the primary metal terminal 15.

Furthermore, at the secondary metal terminal 16, which is less likely to receive the heat from the drive control IC 132a that is spaced from the secondary metal terminal 16, since the contact surface area of the secondary metal terminal 16, which contacts the resin lid 11, is smaller than the contact surface area of the primary metal terminal 15, which contacts the resin lid 11, it is possible to further limit the thermal deformation amount difference between the secondary metal terminal 16 and the resin lid 11 caused by the thermal expansion and contraction. Therefore, even in the case of the secondary metal terminal 16 that has the secondary exposed portion 160, which has the high stiffness, the stress, which is applied to the secondary connecting point P2 in response to the thermal expansion and contraction, can be reliably reduced.

Thereby, it is possible to improve the effect of limiting the change in the stress at the primary and secondary connecting points P1, P2, and thereby it is possible to improve the reliability for the durableness.

Furthermore, in the device 1, the primary exposed portion 150 of the primary metal terminal 15, which is repeatedly bent and extended at the plurality of locations, can easily follow the thermal expansion and contraction through the resilient deformation of the primary exposed portion 150 due to the meandering form extending from the fuel pump 52 side toward the drive circuit 13 located on the upper side of the fuel pump 52. In this way, even if the thermal expansion and contraction are generated, the amount of change in the stress applied to the primary connecting point P1 can be reduced by the reliable resilient deformation of the primary exposed portion 150. Thus, it is possible to improve the effect of limiting the change in the stress at the primary connecting point P1, and thereby it is possible to improve the reliability with respect to the durability.

Furthermore, in the device 1, the primary exposed portion 150, which is in the flat plate form that extends along the reference plane S1 perpendicular to the lateral direction (i.e., the X-direction in the present embodiment), extends in the meandering form along the reference plane S1, so that the primary exposed portion 150 can easily make the resilient deformation in the top-to-bottom direction. With this configuration, the primary exposed portion 150 can reliably make the resilient deformation in the top-to-bottom direction in response to the thermal expansion and contraction in the range that is from the fuel pump 52 to the drive circuit 13 located on the upper side of the fuel pump 52, so that the amount of change in the stress applied to the primary connecting point P1 can be reduced. Thus, it is possible to improve the effect of limiting the change in the stress at the primary connecting point P1, and thereby it is possible to improve the reliability with respect to the durability.

Furthermore, in the device 1, the primary exposed portion 150 of the primary metal terminal 15 extends in the meandering form while the primary exposed portion 150 has the exposed width We, which is smaller than the embedded width WI of the primary embedded portion 152 embedded in the resin lid 11. In this way, the amount of heat transfer to the primary embedded portion 152 can be reduced at the primary exposed portion 150, which is in the flat plate form and is likely to receive the heat from the drive control IC 132a located around the primary exposed portion 150. Thus, it is possible to limit an increase in the thermal deformation amount difference between the resin lid 11 and the primary embedded portion 152 caused by the thermal expansion and contraction, and thereby it is possible to reduce the amount of change in the stress applied to the primary connecting point P1. As a result, this device 1 is particularly advantageous in terms of improving the effect of limiting the change in the stress at the primary connecting point P1 to improve the reliability with respect to the durability.

Furthermore, in this device 1, at the bottom portion 112a of the bottomed circuit housing 112, which defines the receiving space 114 in the resin lid 11, the primary metal terminals 15 are embedded at the center part 112c that is centered at the bottom portion 112a in the lateral direction (i.e., the X-direction in the present embodiment) that is perpendicular to the reference plane S1. Accordingly, each primary metal terminal 15 can absorb the deformation through the resilient deformation of the primary exposed portion 150 while the primary metal terminal 15 is connected to the center part 130a, which can be easily deformed in the circuit board 130 of the drive circuit 13 that defines the receiving space 114. Thus, the stress, which is applied to the primary connecting point P1 in response to the deformation of the circuit board 130, can be reduced, and thereby, it is particularly advantageous in terms of improving the reliability for the durableness.

(Other Embodiments)

Although the one embodiment of the present disclosure has been described, the present disclosure should not be limited to this embodiment. The present disclosure can be implemented in various forms within the scope of the present disclosure.

Figure 9:
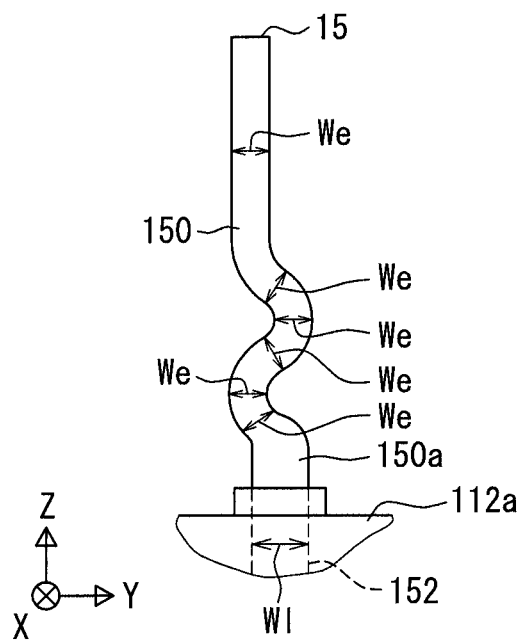
FIG. 9 is a side view showing a modification of FIG. 8.
Figure 10:
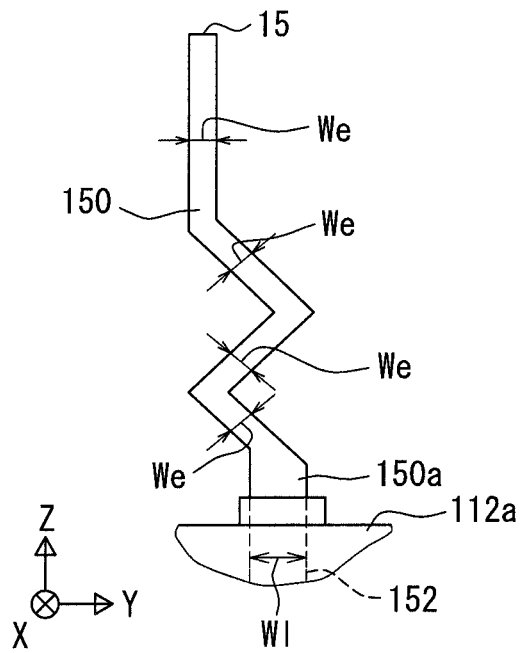
FIG. 10 is a side view showing another modification of FIG. 8.

Specifically, in a first modification of the embodiment, as shown in FIG. 9, the primary exposed portion 150 of each primary metal terminal 15 may be alternately oppositely curved at a plurality of locations to form the primary exposed portion 150 in the meandering form. In a second modification, as shown in FIG. 10, the primary exposed portion 150 of each primary metal terminal 15 may be alternately bent in a zigzag pattern in corresponding directions, which are oblique to the Y and Z directions, at a plurality of locations to form the primary exposed portion 150 in the meandering form. In a third modification, besides the meandering form, each primary metal terminal 15 may be configured in a single curved form where the entire primary exposed portion 150 of the primary metal terminal 15 is curved.

Figure 11:
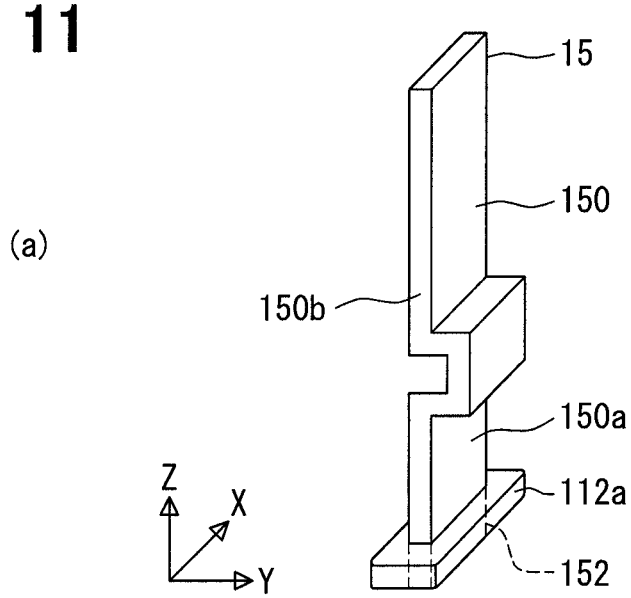
FIG. 11(a) is perspective view showing a further modification of FIG. 8.
FIG. 11(b) is a top view showing the further modification of FIG. 8.
Figure 11:
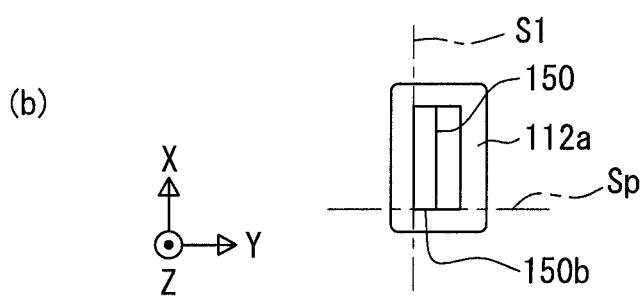
Figure 12:
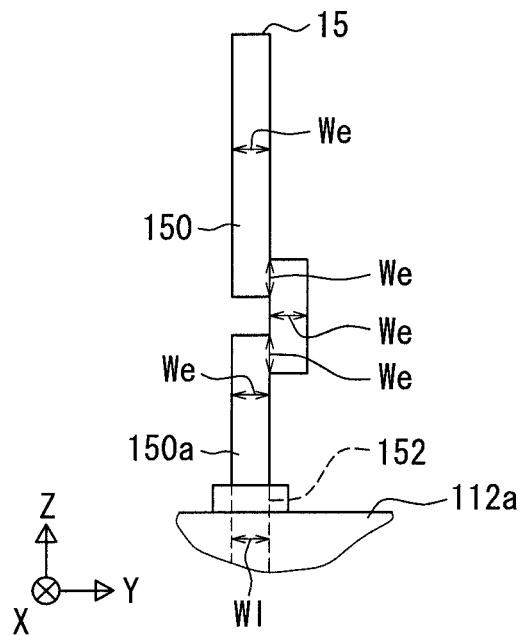
FIG. 12 is a side view showing an additional modification of FIG. 8.
Figure 13:
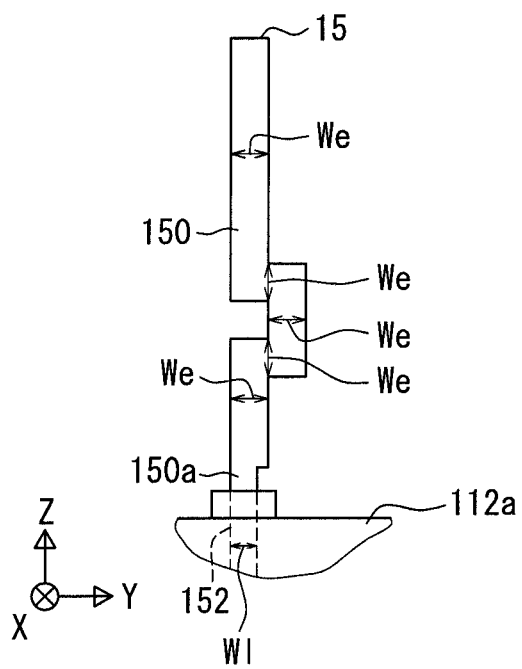
FIG. 13 is a side view showing another modification of FIG. 8.

In a fourth modification, as shown in FIGS. 11(a) and 11(b), each primary metal terminal 15 may be configured in a meandering form such that an end surface (an end surface in the X-direction) 150b of the primary exposed portion 150 extends along an imaginary perpendicular plane Sp that is perpendicular to the reference plane S1. In the fourth modification shown in FIGS. 11(a) and 11(b), the reference plane S1 extends in parallel with the X-direction. Furthermore, as long as the reference plane S1 is a plane that is parallel to the longitudinal direction of the primary exposed portion 150, the reference plane S1 may extend in a lateral direction that is other than the X-direction and the Y-direction. In a fifth modification, in each primary metal terminal 15, which is in the flat plate form, as shown in FIGS. 12 and 13, the exposed width We of the primary exposed portion 150 may be set to be substantially equal to or larger than the embedded width WI of the primary embedded portion 152.

Figure 14:
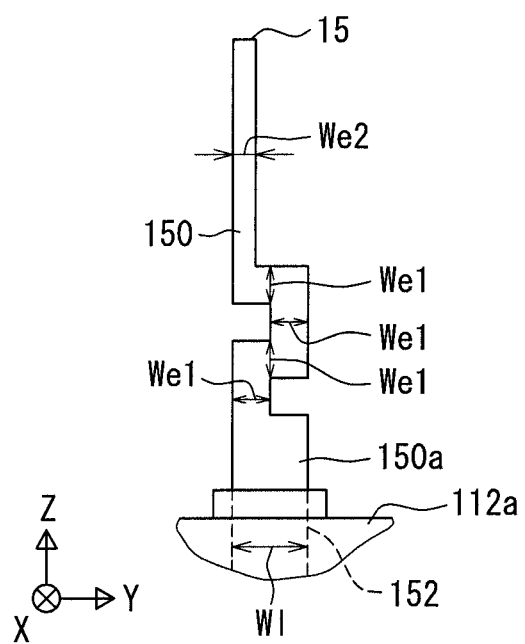
FIG. 14 is a side view showing a further modification of FIG. 8.

In a sixth modification, in each primary metal terminal 15, which is in the flat plate form, as shown in FIG. 14, the exposed width We of the primary exposed portion 150 may be changed in a stepwise manner within a range that is smaller than the embedded width WI of the primary embedded portion 152. In the sixth modification shown in FIG. 14, an exposed width We2 of the primary exposed portion 150 at a location adjacent to the primary connecting point P1 to the drive circuit 13 is reduced in comparison to an exposed width We1 of the primary exposed portion 150 at another location that is other than the location adjacent to the primary connecting point P1, so that a degree of reduction in the amount of heat transfer to the primary embedded portion 152 is increased.

In a seventh modification, each primary metal terminal 15 may be configured into another form, such as a wire form, which is other than the flat plate form, and the primary exposed portion 150 of this primary metal terminal 15 may be configured in the meandering form. In an eighth modification, the primary embedded portion 152 of each primary metal terminal 15 may be embedded at another location of the bottom portion 112a of the circuit housing 112, which is largely displaced from the center part 112c in a lateral direction that is perpendicular to the reference plane S1.

In a ninth modification, in each primary metal terminal 15, the boundary vicinity portion 150a, which has the width that is substantially the same as the width of the primary embedded portion 152, may not be formed in the primary exposed portion 150. In a tenth modification, the contact surface area of the primary embedded portion 152 of each primary metal terminal 15, which contacts the resin lid 11, may be reduced from or substantially equal to the contact surface area between the secondary exposed portion 160 of the secondary metal terminal 16 and the resin lid 11.

In an eleventh modification, the secondary exposed portion 160 of each secondary metal terminal 16 may be configured into another form that is other than the straight form as long as the secondary exposed portion 160 has the high stiffness that is higher than the stiffness of the primary exposed portion 150 of the primary metal terminal 15. In a twelfth modification, the X-direction and the Y-direction may be swapped. In a thirteenth modification, the ventilation spaces 116 and the partition walls 118 may be eliminated. In a fourteenth modification, the tertiary metal terminals 17 and the liquid level detection unit 60 may be eliminated.

The invention claimed is:

1. A tank lid unit that is configured to be installed to a through-hole of a fuel tank and internally includes a drive circuit, which has a heat generating element, to drive a fuel pump received in an inside of the fuel tank according to a control operation of an external circuit system, the tank lid unit comprising:
   a resin lid that is made of resin and closes the through-hole, wherein the resin lid receives the drive circuit in a receiving space formed in an inside of the resin lid;
   a first primary metal terminal and a second primary metal terminal, each of which is made of metal and is configured to connect between the fuel pump and the drive circuit through the resin lid, wherein:
      a primary connecting point of each of the first primary metal terminal and the second primary metal terminal, which is connected to the drive circuit, is set at a location around the heat generating element;
      a primary exposed portion of the first primary metal terminal and a primary exposed portion of the second primary metal terminal are exposed to the receiving space filled with a thermal gel and respectively extend in a planar form only along a first primary reference plane and a second primary reference plane, which are perpendicular to a plane of the drive circuit and are spaced from each other in a direction perpendicular to the first primary reference plane and the second primary reference plane; and
      the primary exposed portion of the first primary metal terminal and the primary exposed portion of the second primary metal terminal are respectively bent only along the first primary reference plane and the second primary reference plane to enable resilient expansion and contraction of the primary exposed portion of the first primary metal terminal and the primary exposed portion of the second primary metal terminal in the thermal gel between the drive circuit and the resin lid in a longitudinal direction of the first primary metal terminal and a longitudinal direction of the second primary metal terminal in response to a change in a temperature around the first primary metal terminal and the second primary metal terminal; and
   a secondary metal terminal that is made of metal and is configured to connect between the external circuit system and the drive circuit through the resin lid, wherein a secondary connecting point of the secondary metal terminal, which is connected to the drive circuit, is set at a location that is further spaced from the heat generating element in comparison to the primary connecting point, and a secondary exposed portion of the secondary metal terminal, which is exposed to the receiving space, has a higher stiffness that is higher than a stiffness of the primary exposed portion.

2. The tank lid unit according to claim 1, wherein a contact surface area of each of the first primary metal terminal and the second primary metal terminal, which contacts the resin lid, is larger than a contact surface area of the secondary metal terminal, which contacts the resin lid.

3. The tank lid unit according to claim 1, wherein the primary exposed portion of each of the first primary metal terminal and the second primary metal terminal is bent at a plurality of locations and thereby extends in a meandering form that meanders from the fuel pump side toward the drive circuit located on an upper side of the fuel pump.

4. The tank lid unit according to claim 3, wherein:
   each of the first primary metal terminal and the second primary metal terminal includes an embedded portion that is embedded in the resin lid in addition to the primary exposed portion;
   the embedded portion of each of the first primary metal terminal and the second primary metal terminal extends along a corresponding one of the first primary reference plane and the second primary reference plane while the embedded portion has a predetermined embedded width along the corresponding one of the first primary reference plane and the second primary reference plane; and
   the primary exposed portion of each of the first primary metal terminal and the second primary metal terminal extends in the meandering form along the corresponding one of the first primary reference plane and the second primary reference plane while the primary exposed portion of each of the first primary metal terminal and the second primary metal terminal has an exposed width that is smaller than the embedded width along the corresponding one of the first primary reference plane and the second primary reference plane.

5. The tank lid unit according to claim 1, wherein:
   the resin lid includes a circuit housing that is bottomed and defines the receiving space;
   the drive circuit includes a circuit board that is placed to partition the receiving space into an upper part and a lower part; and
   the primary metal terminal is embedded in a center part of a bottom portion of the circuit housing while the center part is centered at the bottom portion in a lateral direction that is perpendicular to the first primary reference plane and the second primary reference plane.

6. The tank lid unit according to claim 1, wherein the secondary exposed portion extends straight.

7. A fuel supply device comprising:
   a fuel pump that is configured to supply fuel from an inside to an outside of a fuel tank; and
   a tank lid unit that is installed to a through-hole of the fuel tank and internally includes a drive circuit, which has a heat generating element, to drive the fuel pump received in the inside of the fuel tank according to a control operation of an external circuit system, wherein:

the tank lid unit includes:
- a resin lid that is made of resin and closes the through-hole, wherein the resin lid receives the drive circuit in a receiving space formed in an inside of the resin lid;
- a first primary metal terminal and a second primary metal terminal, each of which is made of metal and is configured to connect between the fuel pump and the drive circuit through the resin lid, wherein:
  - a primary connecting point of each of the first primary metal terminal and the second primary metal terminal, which is connected to the drive circuit, is set at a location around the heat generating element;
  - a primary exposed portion of the first primary metal terminal and a primary exposed portion of the second primary metal terminal are exposed to the receiving space filled with a thermal gel and respectively extend in a planar form only along a first primary reference plane and a second primary reference plane, which are perpendicular to a plane of the drive circuit and are spaced from each other in a direction perpendicular to the first primary reference plane and the second primary reference plane; and
  - the primary exposed portion of the first primary metal terminal and the primary exposed portion of the second primary metal terminal are respectively bent only along the first primary reference plane and the second primary reference plane to enable resilient expansion and contraction of the primary exposed portion of the first primary metal terminal and the primary exposed portion of the second primary metal terminal in the thermal gel between the drive circuit and the resin lid in a longitudinal direction of the first primary metal terminal and a longitudinal direction of the second primary metal terminal in response to a change in a temperature around the first primary metal terminal and the second primary metal terminal; and
- a secondary metal terminal that is made of metal and is configured to connect between the external circuit system and the drive circuit through the resin lid, wherein a secondary connecting point of the secondary metal terminal, which is connected to the drive circuit, is set at a location that is further spaced from the heat generating element in comparison to the primary connecting point, and a secondary exposed portion of the secondary metal terminal, which is exposed to the receiving space, has a higher stiffness that is higher than a stiffness of the primary exposed portion.

8. A tank lid unit that is configured to be installed to a through-hole of a fuel tank and internally includes a drive circuit, which has a heat generating element, to drive a fuel pump received in an inside of the fuel tank according to a control operation of an external circuit system, the tank lid unit comprising:
- a resin lid that is made of resin and closes the through-hole, wherein the resin lid receives the drive circuit in a receiving space formed in an inside of the resin lid;
- a primary metal terminal that is made of metal and is configured to connect between the fuel pump and the drive circuit through the resin lid, wherein a primary connecting point of the primary metal terminal, which is connected to the drive circuit, is set at a location around the heat generating element, and a primary exposed portion of the primary metal terminal, which is exposed to the receiving space, is bent such that the primary exposed portion is resiliently deformable; and
- a secondary metal terminal that is made of metal and is configured to connect between the external circuit system and the drive circuit through the resin lid, wherein a secondary connecting point of the secondary metal terminal, which is connected to the drive circuit, is set at a location that is further spaced from the heat generating element in comparison to the primary connecting point, and a secondary exposed portion of the secondary metal terminal, which is exposed to the receiving space, has a higher stiffness that is higher than a stiffness of the primary exposed portion, wherein:

the resin lid includes a circuit housing that is bottomed and defines the receiving space;

the drive circuit includes a circuit board that is placed to partition the receiving space into an upper part and a lower part; and the primary metal terminal is embedded in a center part of a bottom portion of the circuit housing while the center part is centered at the bottom portion in a lateral direction that is perpendicular to a reference plane.

* * * * *